United States Patent [19]

Soshi et al.

[11] Patent Number: 5,339,123
[45] Date of Patent: Aug. 16, 1994

[54] DATA IMPRINTING DEVICE FOR CAMERA

[75] Inventors: Isao Soshi; Motoyuki Ohtake; Hidenori Miyamoto, all of Tokyo, Japan

[73] Assignee: Nikon Corporation, Tokyo, Japan

[21] Appl. No.: 120,019

[22] Filed: Sep. 10, 1993

[30] Foreign Application Priority Data

Sep. 10, 1992 [JP] Japan ................... 4-241896
Jan. 28, 1993 [JP] Japan ................... 5-012073

[51] Int. Cl.⁵ .......................................... G03B 17/24
[52] U.S. Cl. .......................... 354/106; 352/92; 359/738
[58] Field of Search ............... 354/106; 352/92; 359/708, 720, 724, 737, 738

[56] References Cited

U.S. PATENT DOCUMENTS

| | | | |
|---|---|---|---|
| 3,029,717 | 4/1962 | Hildebrandt | 354/106 |
| 4,544,259 | 10/1985 | Kanaoka et al. | 352/92 |
| 4,553,833 | 11/1985 | Kanaoka et al. | 352/92 |
| 4,973,997 | 11/1990 | Harvey | 354/106 |
| 5,004,332 | 4/1991 | Edwards | 359/738 |
| 5,023,637 | 6/1991 | Lorton et al. | 354/106 |
| 5,210,645 | 5/1993 | Orino et al. | 359/738 |

*Primary Examiner*—Monroe H. Hayes
*Attorney, Agent, or Firm*—Peter Jan Gluck; Thomas R. Morrison

[57] ABSTRACT

An optical piece for a data imprinting device for a camera having beam incident and beam emerging areas. Beam incident and beam emerging areas have an effective aperture for passing a main beam of light and a peripheral beam refracting surface around and defining the effective aperture. This structure eliminates ghosts or flares generated by light rays passing through the peripheral portion of the optical piece. The peripheral beam refracting surface is equivalent to the surface of a lens having a negative index of refraction or one of the bilateral plane surfaces of a triangular prism with its apex pointing toward the optical axis of the optical piece. The lens geometry is controlled by a set of four inequalities. The effective aperture may use convex, planar or concave shapes.

13 Claims, 10 Drawing Sheets

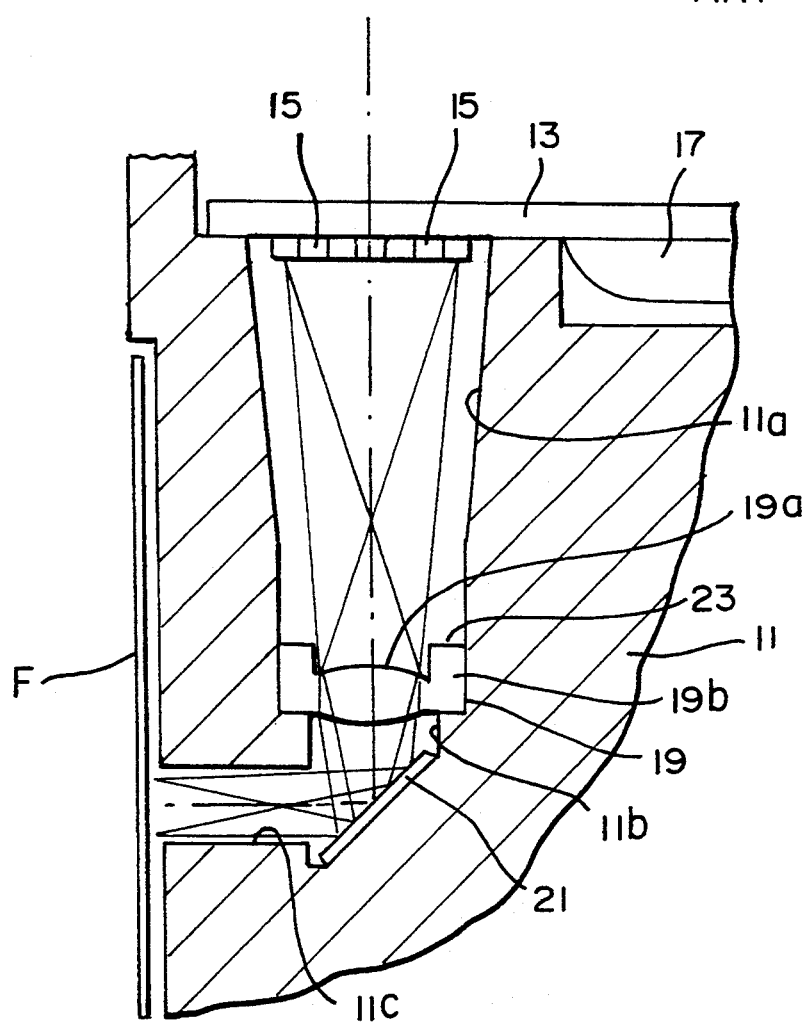

DATA IMPRINTING DEVICE FOR CAMERA

BACKGROUND OF THE INVENTION

This invention relates to data imprinting devices for a camera, which can imprint and superpose on a picture to be photographed certain types of data, such as the date when the picture is taken. More particularly, the invention relates to a data imprinting device having an optical piece which effectively limits the diameter of an incident beam of light to produce an emerging beam of light with a desired cross sectional diameter.

Referring to FIG. 11, a conventional data imprinting device 10 imprints and superposes data on a film F. Data imprinting device 10 includes a data imprinting printed wired board (PWB) 13 located in an upper portion of a camera body 11. A plurality of light emitting elements 15, such as a row of light emitting diodes, is disposed on a lower surface of the data imprinting PWB 13. A driving circuit 17 to drive the light emitting elements 15 is also disposed on the lower surface of data imprinting PWB 13.

The camera body 11 has a first cavity 11a beneath the light emitting elements 15 for allowing the data imprinting light beams to travel through. A data imprinting optical piece 19 is disposed at the bottom of the first cavity 11a. The camera body 11 also has two additional cavities. A connecting cavity 11b has a reflecting member 21 fixed at the bottom thereof. Connecting cavity 11b links the first cavity 11a to a second cavity 11c extending perpendicular to the first cavity 11a and opening onto the film F.

Functionally, the illuminating light emanating from the light emitting elements 15 travels through the data imprinting optical piece 19. The light reflects off the reflecting member 21, and is focused through the second cavity 11c to the sensitive surface of the film F, generating the superposed data on the photographed picture.

The data imprinting device 10 uses a masking diaphragm 23 to block stray light L, which would otherwise impinge on a peripheral portion 19b. Masking diaphragm 23 sits above the upper surface of a peripheral portion 19b, integrally formed around a lens proper 19a of the data imprinting optical piece 19. The masking diaphragm 23 effectively controls the diameter of the incident beam of light.

Referring now to FIGS. 12 and 13, an upper surface 19d of the peripheral portion 19b is disposed perpendicular to an optical axis 19e of the lens proper 19a. In the absence of masking diaphragm 23, stray light L falling on the peripheral portion 19b is refracted therethrough into the lens proper 19a and further reaches the film F causing a flare, which results in degraded picture quality. Masking diaphragm 23 is therefore required to block the stray light L from impinging onto the peripheral portion 19b of the optical piece 19.

However, using the masking diaphragm 23 in the conventional data imprinting device 10 increases the production cost of the device. Another conventional method is to paint the upper surface 19d of the corresponding peripheral portion 19b with black pigment. However, this also does not eliminate the increased production costs.

A further method limits the beam diameter by the external periphery of the beam incident or emerging surfaces of the optical piece 19. A still further method limits the beam diameter by the internal periphery of the beam incident or emerging surface of the optical piece 19. These conventional methods for obtaining a main beam of light by controlling the diameter of an incident beam of light, do not sufficiently eliminate the effects of stray light L.

According to the further method, the external periphery defines the effective aperture. In other words, the entire incident or emerging surface serves as an effective aperture. However, this method has the following drawback. As shown in FIG. 14(a), a light beam falling within the effective aperture, but having a directional aberration with respect to the optical axis of the lens, hits the side wall of the lens, reflects off the side wall, and gives rise to ghosts. This occurs especially when the light beam falls on the part of the incident surface outside the effective aperture, since the beam tends to reach the side wall and thereby generates ghosts.

According to the still further method, the internal periphery defines the effective aperture. The part of the incident or emerging surface between the external and the internal peripheries is roughened or frosted so that the light rays falling outside the effective aperture are dispersed, suppressing flare components. However, this method also has a problem. As shown in FIG. 14(b), a light beam falling outside the effective aperture disperses when hitting the roughened or frosted area. The dispersion, however, only subdues flare components to a certain degree.

Referring to FIG. 14(c), another embodiment of the prior art employs a masking diaphragm about the perimeter of a lens, similar to the prior art embodiment in FIGS. 11–13. This embodiment does not have an upper portion corresponding to 19d in FIG. 13. This embodiment has the same, or worse, problems as the embodiment in FIGS. 11–13.

OBJECT AND SUMMARY OF THE INVENTION

Accordingly, it is an object of this invention to provide a data imprinting device which eliminates the drawbacks of the prior art.

It is another object of this invention to provide a data imprinting device for use in a camera, which dispenses with a means to block the stray light impinging on the peripheral portion of the data imprinting optical member.

It is still a further object of this invention to provide an optical piece which can eliminate flare components and ghosts by effectively limiting the diameter of an incident beam of light without using a diaphragm.

It is still another object of this invention to provide an optical piece which can eliminate flare components and ghosts by using an inexpensive method.

Briefly stated, an optical piece for a data imprinting device for a camera have beam incident and beam emerging areas. Beam incident and beam emerging areas have an effective aperture for passing a main beam of light and a peripheral beam refracting surface around and defining the effective aperture. This structure eliminates ghosts or flares generated by light rays passing through the peripheral portion of the optical piece. The peripheral beam refracting surface is equivalent to the surface of a lens having a negative index of refraction or one of the bilateral plane surfaces of a triangular prism with its apex pointing toward the optical axis of the optical piece. The lens geometry is controlled by a set of four inequalities. The effective aperture may use convex, planar or concave shapes.

According to an embodiment of the present invention, a data imprinting device for use in a camera comprises: a plurality of light emitting elements, means for guiding illuminating light emitted from the plurality of light emitting elements, a lens, the lens including a central portion and a peripheral refracting surface integrally formed around the central portion, and the peripheral refracting surface having a shape effective for refracting the illuminating light cast thereon away from an optical axis passing through the central portion.

According to a further embodiment of the present invention, an optical piece comprises: a beam incident area, a beam emerging area, at least one of a plane and convex beam passing surface with an effective aperture in the beam incident area and the beam emerging area for passing a main beam of light, a peripheral refracting surface around and defining a perimeter of the effective aperture, the peripheral refracting surface satisfing the two inequalities: $(n'-n) \, df_k(y)/dy < 0$ and $(n'-n) \, d^2f_k(y)/dy^2 \leq 0$.

According to a still further embodiment of the present invention, an optical piece comprises: a beam incident area, a beam emerging area, at least one concave beam passing surface with an effective aperture in the beam incident area and beam emerging area for passing a main beam of light, a peripheral refracting surface around and defining the beam passing surface, the peripheral refracting surface satisfying the inequalities $|df_k(y)/dy| > |F_k|$ and $(n'-n)d^2f_k(y)/dy^2 \leq 0$.

According to a still further embodiment of the present invention, a camera comprises: a plurality of light emitting elements, means for guiding illuminating light from the plurality of light emitting elements to a surface, optical means for focussing the illuminating light on the surface of a photosensitive means for imprinting data, and the optical means having a lens forming a central portion of the optical means, and a peripheral refracting surface integrally formed around the lens, the peripheral refracting surface having a surface effective to refract the illuminating light falling thereon away from an optical axis passing through a center of the optical means.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 11 is a cross sectional view of the prior art.

DETAILED DESCRIPTION OF THE PREFERRED EMBODIMENTS

Figure 1:
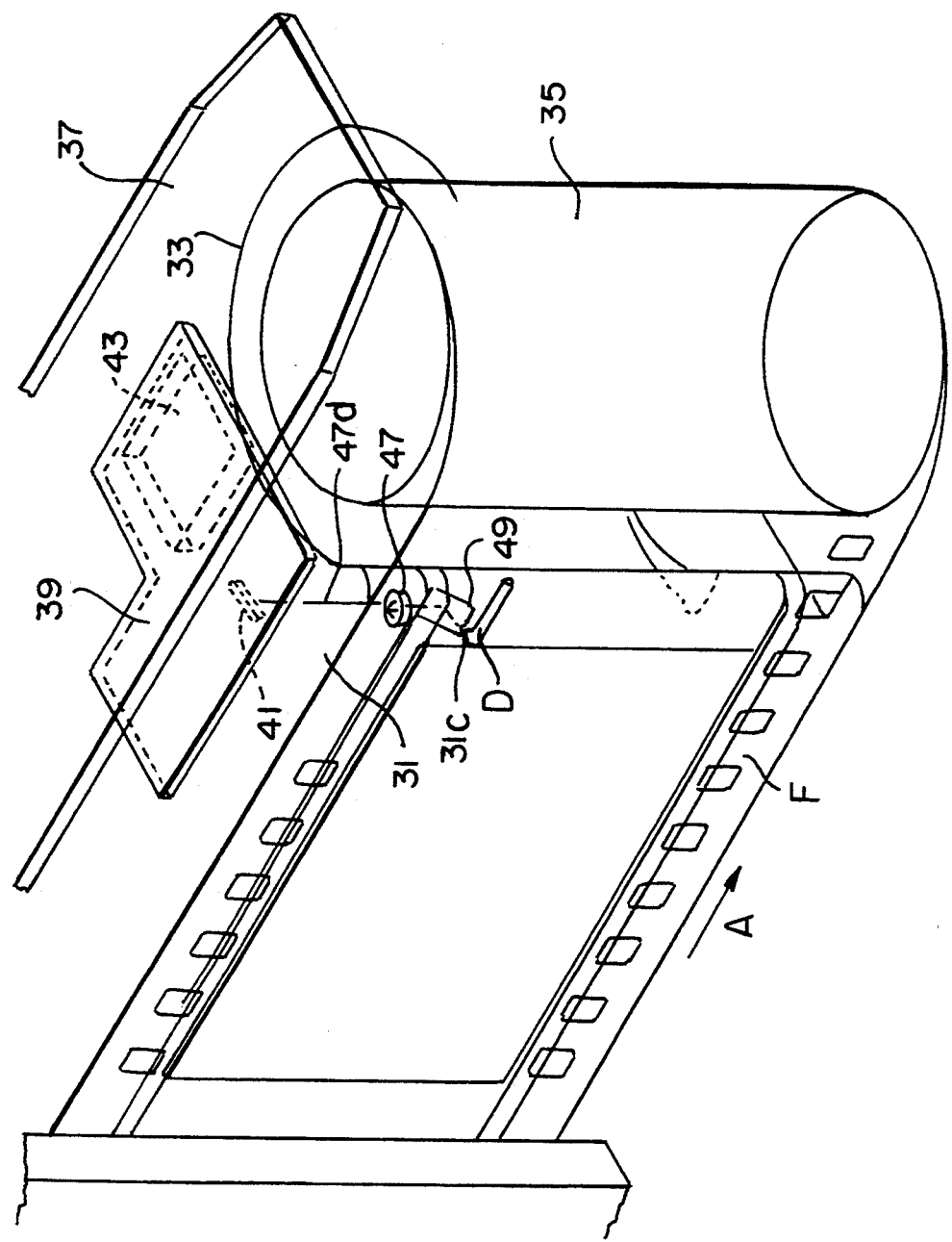
FIG. 1 is a perspective view of an embodiment of a data imprinting device for a camera, according to the present invention.

Referring to FIG. 1, a camera body 31 has a film spool chamber 33, containing a spool 35 on which a photographic film F is wound in the direction designated by an arrow A. A main printed wired board (PWB) 37 sits in an upper portion of the camera body 31. A data imprinting PWB 39 is located beneath the main PWB 37. The data imprinting PWB 39 includes a row of light emitting elements 41 on a lower surface thereof. Light emitting elements 41 may be, for example, LEDs. A driving circuit 43 for driving the light emitting elements 41 is also mounted on data imprinting PWB 39.

Figure 2:
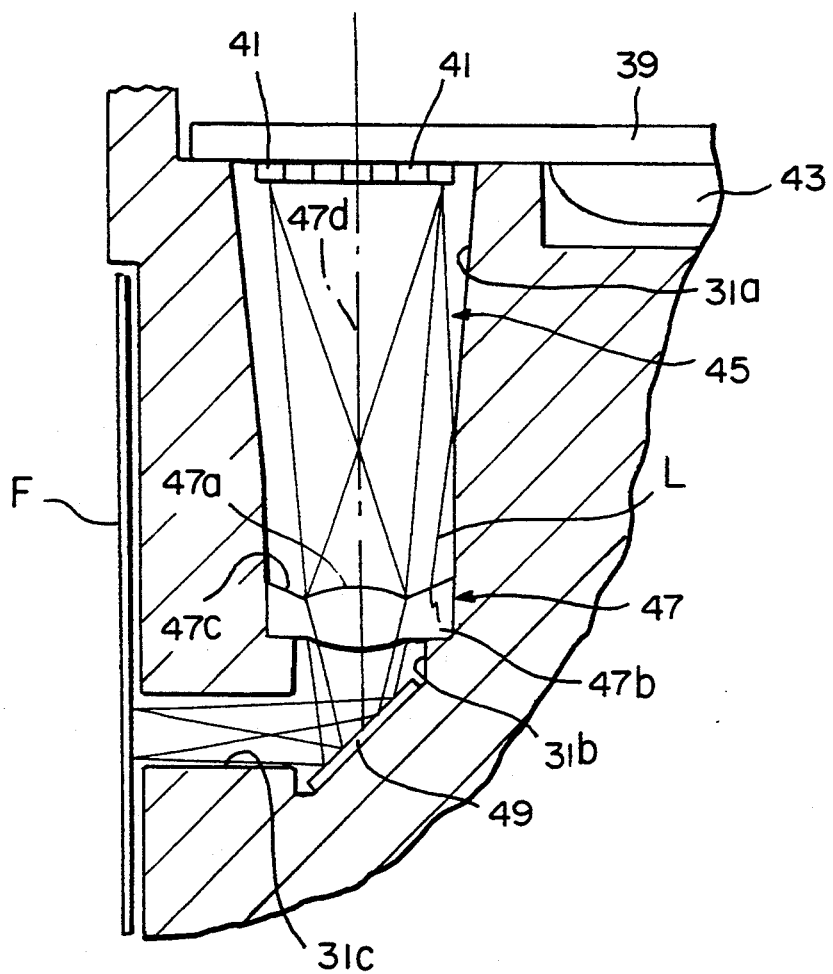
FIG. 2 is a cross sectional view of the principal part of the data imprinting device shown in FIG. 1.

Referring now to FIG. 2, camera body 31 has a first cavity 31a beneath the light emitting elements 41 to serve as a data imprinting light path 45. Data imprinting optical member 47 is mounted at the bottom of the first cavity 31a. The bottom of the first cavity 31a communicates with a connecting cavity 31b in which a reflecting member 49 is mounted. The connecting cavity 31b communicates with a second cavity 31c which extends perpendicular to the first cavity 31a to face a photographic film F.

Figure 3:
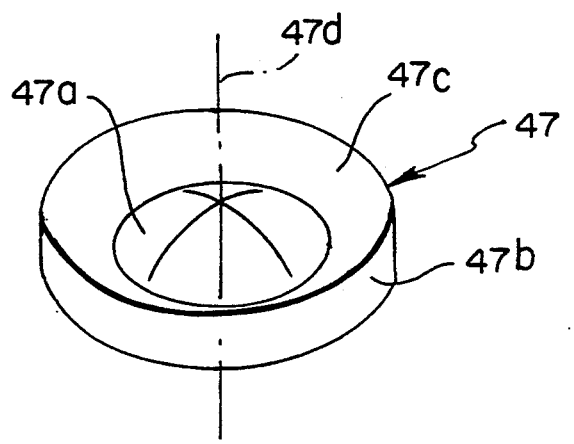
FIG. 3 is a perspective view of the data imprinting optical piece as shown in FIG. 2.
Figure 4:
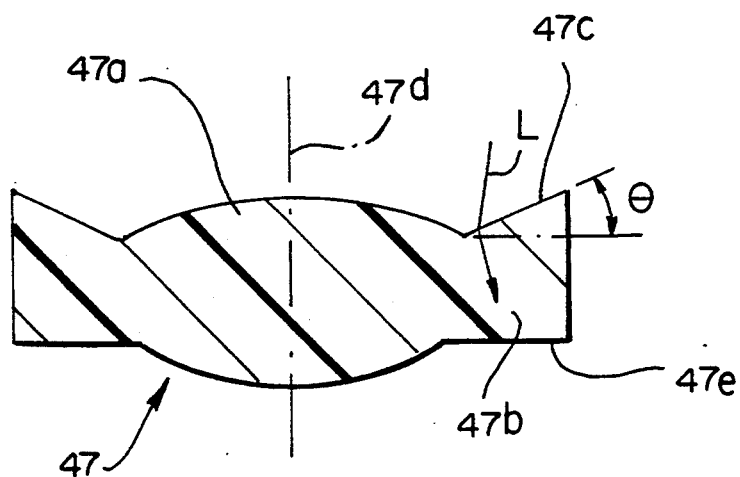
FIG. 4 is a cross sectional view of the data imprinting device shown in FIG. 3.

FIGS. 3 and 4 show in detail the data imprinting optical piece 47 shown in FIGS. 1 and 2. The optical piece 47 has a peripheral portion 47b formed integrally around a lens proper 47a thereof. Peripheral portion 47b has a refracting surface 47c facing the light emitting elements 41. The refracting surface 47c refracts stray light L impinging thereon away from the optical axis 47d of the optical member 47. In this embodiment, the refracting surface 47c slopes down linearly in a radial direction toward the optical axis 47d, with an angle of descent equal to $\theta$. Lower surface 47e of the peripheral portion 47b is flat and perpendicular to the optical axis 47d.

Illuminating light emitted from light emitting elements 41 passes through the data imprinting optical piece 47, reflects off the reflecting member 49, and is focused through the second cavity 31c onto the film F. Data is imprinted in superposition on a predetermined area D of a photographed picture, as shown in FIG. 1.

This geometry eliminates the need for a blocking mechanism since the stray light L falling on the peripheral portion 47b, is refracted away from the optical axis 47d by refracting surface 47c. Therefore the stray light L fails to reach the film F and generate a flare. Consequently, neither a masking diaphragm nor a black paint layer is required. This decreases production costs.

Figure 5:
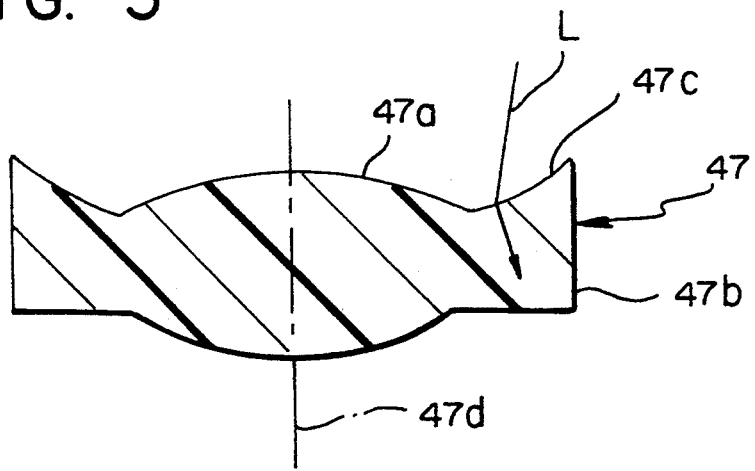
FIG. 5 is a cross sectional view of a second embodiment of the data imprinting optical piece according to the present invention.

FIG. 5 shows a data imprinting optical piece 47 according to a second embodiment of this invention. Optical piece 47 has a refracting surface 47c defining the upper surface of the peripheral portion 47b. The refracting surface 47c slopes concavely down in the radial direction toward the optical axis 47d of the optical member 47. This variation in structure also results in a similar decrease in production cost.

Figure 6A:
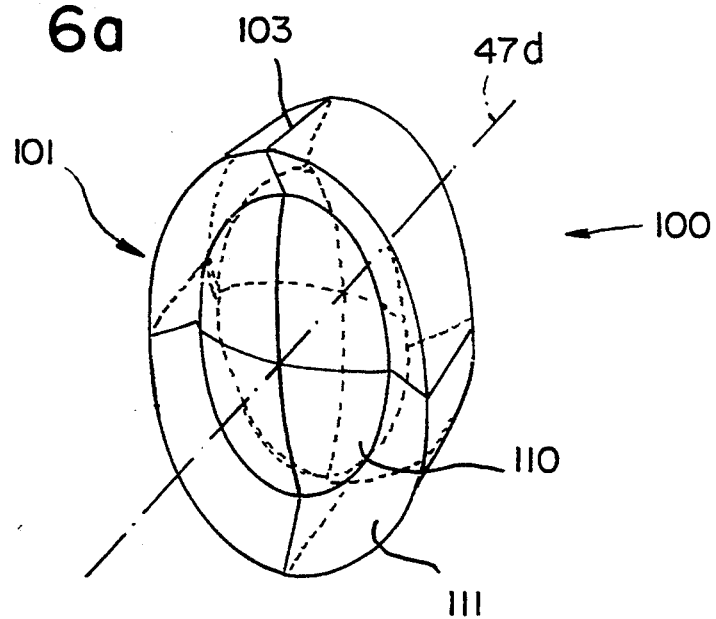
FIG. 6(a) is a perspective view of an optical piece according to a third embodiment of the present invention.
Figure 6B:
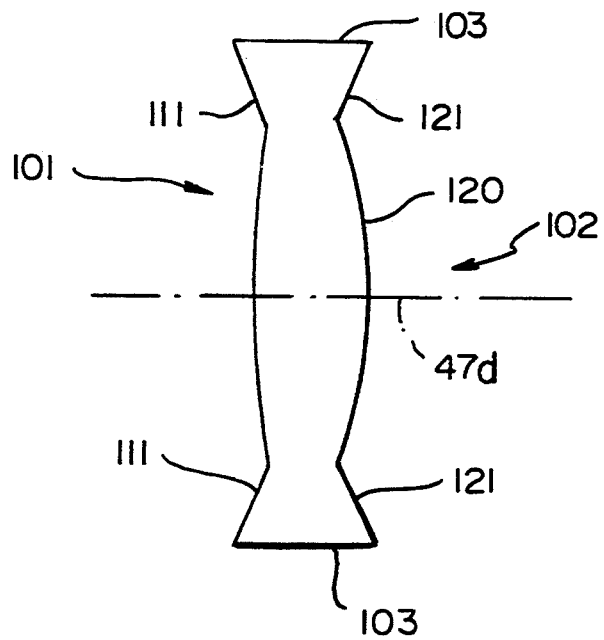
FIG. 6(b) is a cross sectional view of an optical piece according to a third embodiment of the present invention.

The optical piece 47 is now described in more detail. Referring to FIG. 6(a) and 6(b), optical piece 47 has a beam incident area 101. Beam incident area 101 includes a beam incident surface 110 having an effective aperture and a first peripheral beam refracting surface 111. Optical piece 47 also has an emerging beam area 102. Beam emerging area 102 includes a beam emerging surface 120 having an effective aperture and a second peripheral beam refracting surface 121. First and second peripheral beam refracting surfaces, 111 and 121 respectively, encircle and define the effective aperture of the beam incident surface 110 and the beam emerging surface 120. Optical axis 47d is also shown for explanatory purposes.

First and second peripheral beam refracting surfaces 111 and 121 must satisfy the following inequalities to eliminate the effects of stray light. If at least one of the beam incident or beam emerging areas, 101 or 102, is comprised of a plane or convex beam incident surface 110 or beam emerging surface 120 then inequalities (1) and (2) must be met. If at least one of the beam incident or beam emerging areas, 101 or 102, is comprised of a concave beam incident surface 110 or beam emerging surface 120 then inequalities (2) and (3) must be met. Moreover, for all three types of surfaces, the geometrical conditions of the physical structure of the peripheral beam refracting surfaces 111 and 121 must satisfy inequality (4). The inequalities are defined as follows:

$$(n'-n)df_k(y)/dy < 0 \quad (1)$$

$$(n'-n)\,d^2f_k(y)/dy^2 \geq 0 \quad (2)$$

$$|df_k(y)/dy| > |F_k| \quad (3)$$

$$|df_k(y)/dy| < 1 \quad (4)$$

The quantities cited in the above formulae are defined as follows:

$$F_k = \lim_{\Delta h \to 0} \frac{f_k(h_{max} + \Delta h) - f_k(\Delta h)}{h_{max} + \Delta h}$$

$h_{max}$: the distance from the optical axis to the boundary between the beam incident surface and the peripheral beam refracting surface.

n: the refractive index for the wavelength under consideration of the material constituting the optical piece.

n': the refractive index for the wavelength under consideration of the medium surrounding the optical piece.

$f_k(y)$: sag at the distance y measured from the optical axis along the peripheral beam refracting surface, where $f_k(0)=0$; k=1, 2, ... in the direction of beam propagation; and the direction of beam propagation is regarded as positive.

The meanings of the above inequalities (1) through (4) will now be described. The inequalities (1) and (2) control the geometry of the peripheral beam refracting surfaces 111 and 121. Specifically, inequality (1) determines the gradient of the tangent to the peripheral beam refracting surfaces 111 and 121. If a value exceeds the maximum value allowed by inequality (1), the rays of light falling on the peripheral beam refracting surfaces 111 and 121 refract toward the optical axis, resulting in flare components. Obviously, this kind of design should be avoided. Furthermore, the value chosen must not be greater than the maximum allowable under inequality (2). A number outside the range of inequality (2) decreases the degree of refraction achieved for a ray of light as the distance increases from the optical axis 47d to a position on the peripheral refracting surfaces, 111 and 121, at which the ray of light impinges. This results in flare components and therefore is undesirable.

Inequality (3) must be satisfied when the geometry of at least one of the peripheral refracting surfaces 111, 121 is concave. Inequality (3) determines the allowable range of values for the gradient of the tangent to the peripheral refracting surface 111 or 121. If the selected value exceeds the maximum value allowed, the rays of light falling on the peripheral refracting surface 111 or 121, are refracted toward the optical axis 47d, resulting in flare components.

Inequality (4) must be satisfied to further eliminate flare and ghost components. It determines the lentiform geometries of the beam incident and emerging areas 101, 102. If the maximum value attainable under inequality (4) is exceeded, the incident angles of light rays cast onto the beam incident and emerging surfaces 101, 102 becomes large enough to cause reflection from one or both of the surfaces, giving rise to flare components.

Referring back to FIGS. 6(a) and 6(b), a third embodiment of optical piece 47 has a convex-convex or double convex lens. The beam incident and emerging surfaces 110, 120 are lenticular surfaces having certain radii of curvature. Peripheral refracting surfaces 111, 121 are equivalent to the bilateral plane surfaces of a triangular prism which has its apex pointing toward the optical axis 47d.

Figure 7A:
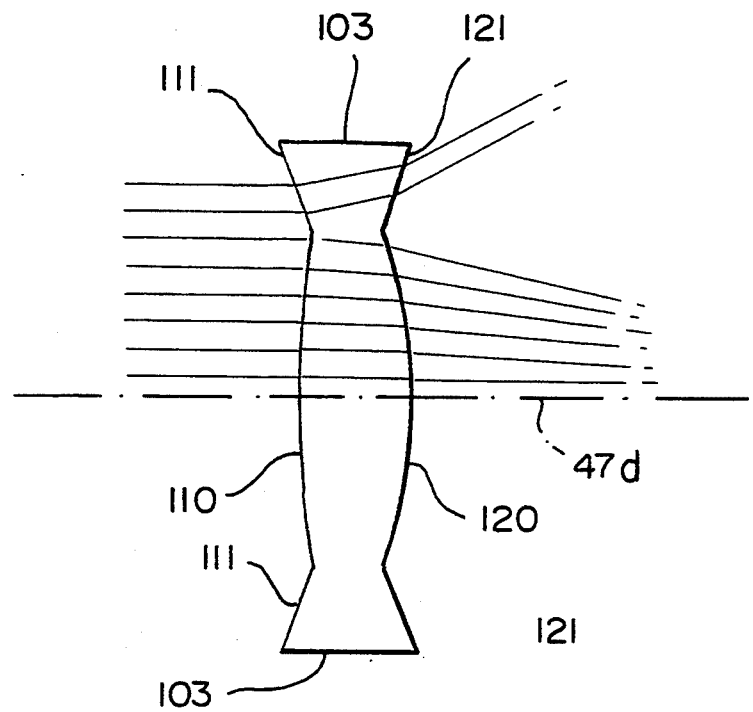
FIG. 7(a) shows the paths of light rays incident on the optical piece shown in FIGS. 6(a) and 6(b), with their incident direction parallel to the optical axis of the piece.
Figure 7B:
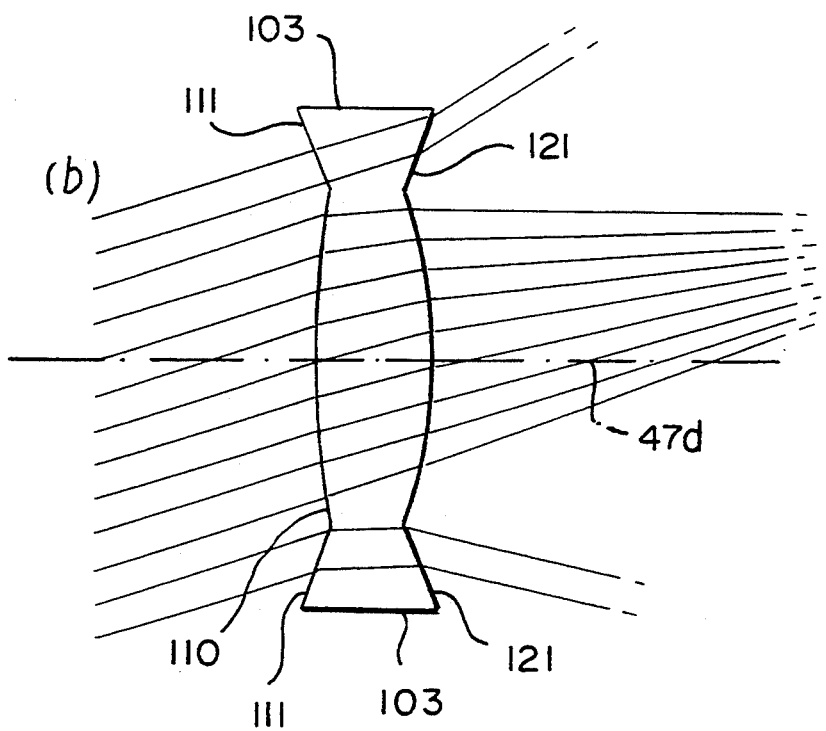
FIG. 7(b) shows the paths of light rays incident on the optical piece shown in FIGS. 6(a) and 6(b), with their incident direction inclined to the optical axis of the piece.

FIGS. 7(a) and 7(b) illustrate the effects on light rays impinging on the incident surface 110 in parallel and inclined directions. FIG. 7(a) shows the light rays impinging parallel to the optical axis 47d on the peripheral refracting surface 111 of the beam incident area 101. The light rays are refracted away from optical axis 47d and toward beam emerging surface 121. The light rays are then refracted by the beam emerging surface 121 and diverted out of the imaging area.

FIG. 7(b) shows the light rays impinging on peripheral refracting surface 111 at an angle relative to the optical axis 47d. However, the light rays cannot reach a side wall of the lens 103 since the effective diameter of the lens is increased by the addition of the peripheral refracting surfaces 111 and 121. Even if some light rays reach the side wall 103, the light rays can be diverted from the main beam path by cutting notches in the side wall 103 or by roughening or frosting the side wall 103. Thus, the main beam is not adversely affected by the stray rays. The peripheral refracting surfaces 111 and 121 are basically optical plane surfaces.

The following are the optical and physical characteristics of the optical piece 47 according to the third embodiment of the invention.
Outer diameter: 36 mm
Thickness along optical axis: 5 mm
Wavelength of light: 587.6 nm
Material: Acrylic resin (refractive index=1.49108 for a wavelength 587.6 nm)
Optical characteristics of the incident surface:
Maximum effective diameter: 24 mm
Radius of curvature $r_1$: 75 mm
Sag: Constant $k=-\frac{1}{2}$, derived by the following formulae:

$$f_1(y)=r_1-(r_1{}^2-y^2)^{\frac{1}{2}} \quad (y<h_{max})$$

$$f_1(y)=r_1-(r_1{}^2-h_{max}{}^2)^{\frac{1}{2}}+k(y-h_{max}) \quad (y>h_{max})$$

Optical characteristics of the emerging surface:
Maximum effective diameter: 24 mm
Radius of curvature $r_2$: −40 mm
Sag: Constant $k=\frac{1}{2}$, derived by the following formulae:

$$f_2(y)=r_2-(r_2{}^2-y^2)^{\frac{1}{2}} \quad (y<h_{max})$$

$$f_2(y)=r_2+(r_2{}^2-h^{max2})^{\frac{1}{2}}+k(y-h_{max}) \quad (y>h_{max})$$

Tables 1 through 4 give numerical data obtained for the third embodiment. The following numerical results are obtained for the incident geometry from the inequalities (1) and (2).

TABLE 1

| y(mm) | inequality (1) | inequality (2) |
|---|---|---|
| 12.5 | −0.246 | 0.000 |
| 13.0 | −0.246 | 0.000 |
| 13.5 | −0.246 | 0.000 |
| 14.0 | −0.246 | 0.000 |
| 14.5 | −0.246 | 0.000 |
| 15.0 | −0.246 | 0.000 |
| 15.5 | −0.246 | 0.000 |
| 16.0 | −0.246 | 0.000 |
| 16.5 | −0.246 | 0.000 |
| 17.0 | −0.246 | 0.000 |
| 17.5 | −0.246 | 0.000 |
| 18.0 | −0.246 | 0.000 |

The following numerical results are obtained, for the incident geometry from inequality (4).

TABLE 2

| y(mm) | inequality (4) | y(mm) | inequality (4) |
|---|---|---|---|
| 1.0 | 0.013 | 10.0 | 0.135 |
| 2.0 | 0.027 | 11.0 | 0.143 |
| 3.0 | 0.040 | 12.0 | — |
| 4.0 | 0.053 | 13.0 | 0.500 |
| 5.0 | 0.067 | 14.0 | 0.500 |
| 6.0 | 0.080 | 15.0 | 0.500 |
| 7.0 | 0.094 | 16.0 | 0.500 |
| 8.0 | 0.107 | 17.0 | 0.500 |
| 9.0 | 0.121 | 18.0 | 0.500 |

The following numerical results are obtained for the emerging geometry from the inequalities (1) and (2).

TABLE 3

| y(mm) | inequality (1) | inequality (2) |
|---|---|---|
| 12.5 | −0.246 | 0.000 |
| 13.0 | −0.246 | 0.000 |
| 13.5 | −0.246 | 0.000 |
| 14.0 | −0.246 | 0.000 |
| 14.5 | −0.246 | 0.000 |
| 15.0 | −0.246 | 0.000 |
| 15.5 | −0.246 | 0.000 |
| 16.0 | −0.246 | 0.000 |
| 16.5 | −0.246 | 0.000 |
| 17.0 | −0.246 | 0.000 |
| 17.5 | −0.246 | 0.000 |
| 18.0 | −0.246 | 0.000 |

The following numerical results are obtained for the emerging geometry from the inequality (4).

TABLE 4

| y(mm) | inequality (4) | y(mm) | inequality (4) |
|---|---|---|---|
| 1.0 | 0.025 | 10.0 | 0.258 |
| 2.0 | 0.050 | 11.0 | 0.286 |
| 3.0 | 0.075 | 12.0 | — |
| 4.0 | 0.101 | 13.0 | 0.500 |
| 5.0 | 0.126 | 14.0 | 0.500 |
| 6.0 | 0.152 | 15.0 | 0.500 |
| 7.0 | 0.178 | 16.0 | 0.500 |
| 8.0 | 0.204 | 17.0 | 0.500 |
| 9.0 | 0.231 | 18.0 | 0.500 |

Figure 8A:
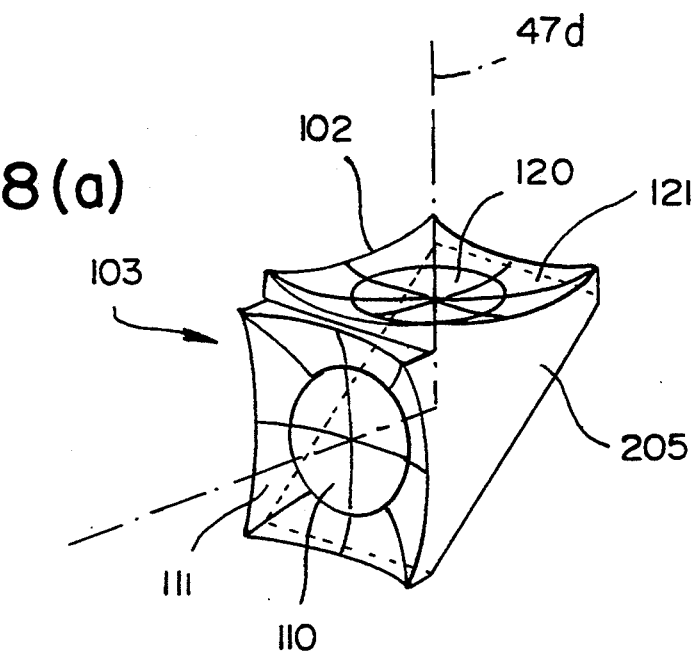
FIG. 8(a) is a perspective view of an optical piece according to a fourth embodiment of the present invention.
Figure 8B:
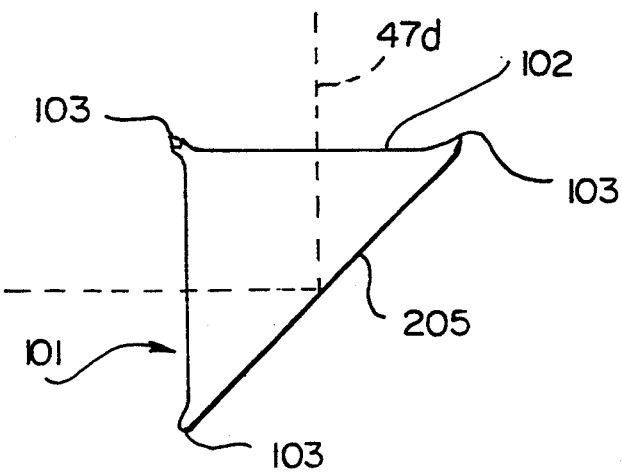
FIG. 8(b) is a cross-sectional view of an optical piece according to a fourth embodiment of the present invention.

FIGS. 8(a) and 8(b) shows optical piece 47 in a fourth embodiment of the present invention. Optical piece 47 is a triangular prism. Beam incident area 101 has a beam incident surface 110 with an effective aperture and a peripheral refracting surface 111 encircling and defining the effective aperture. Beam incident area 101 also includes side wall 103. Beam emerging area at 102 has a beam emerging surface 120 with an effective aperture and a peripheral refracting surface 121 encircling and defining the effective aperture. Beam emerging area also includes side wall 103. In addition, optical piece 47 consists of a reflecting surface 205, which is described below.

Figure 9:
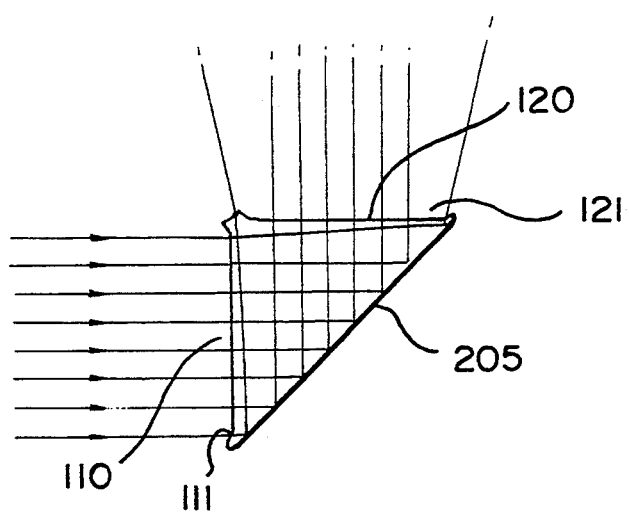
FIG. 9 shows the paths of light rays falling on both the incident surface having an effective aperture and the peripheral refracting surface, of the optical piece shown in FIGS. 8(a) and 8(b).

FIG. 9 shows light rays impinging on the beam incident area 101 of the optical piece 47. The main beam of the incident light rays falling on incident area 101 impinges on the beam incident surface 110 having an effective aperture. The remaining part of the beam impinges on the peripheral refracting surface 111 surrounding the beam incident surface 110. The main beam is reflected by the reflecting surface 205 and emerges from the beam emerging surface 120 having an effective aperture.

The remaining part of the beam is refracted away from the optical axis 47d by the peripheral refracting surface 111, which acts similarly to a lenticular surface having a large negative index of refraction. The remaining part of the beam is then reflected by the reflecting surface 205 to the peripheral refracting surface 121 of the beam emerging area 102. The light rays are then refracted away from the optical axis 47d by the peripheral refracting surface 121, which also behaves like a lenticular surface having a large negative index of refraction. The light rays then emerge in beam emerging area 102. Thus, the light rays impinging on the peripheral refracting surface 111 travel in a direction different from that of the main beam and therefore have no adverse influence on the main beam.

The following are the optical and physical characteristics of the optical piece 47 as a fourth embodiment of the present invention.
Outer dimensions: 20 mm×20 mm
Thickness along optical axis: 20 mm
Wavelength of light: 587.6 nm
Material: Acrylic resin (refractive index=1.49108 for a wavelength 587.6 nm)
Optical characteristics of the incident surface:
Maximum effective diameter: 16 mm
Radius of curvature $r_1$: −20.0833 mm
Sag: d=3 mm, derived by the following formulae:

$$f_1(y)=0 \ (y<h_{max})$$

$$f_1(y)=r_1-(r_1^2-y^2)^{\frac{1}{2}}+d \ (y>h_{max})$$

Optical characteristics of the emerging surface:
Maximum effective diameter: 16 mm
Radius of curvature $r_2$: +20.0833 mm
Sag: d=−3 mm, derived by the following formulae:

$$f_2(y)=0 \ (y<h_{max})$$

$$f_2(y)=r_2-(r_2^2-y^2)^{\frac{1}{2}}+d \ (y>h_{max})$$

Tables 5 through 8 give numerical data obtained for the fourth embodiment.
The following numerical results are obtained for the incident geometry from the inequalities (1) and (2).

TABLE 5

| y(mm) | inequality (1) | inequality (2) |
| --- | --- | --- |
| 8.25 | −0.198 | −0.0279 |
| 8.50 | −0.205 | −0.0283 |
| 8.75 | −0.212 | −0.0287 |
| 9.00 | −0.219 | −0.0292 |
| 9.25 | −0.227 | −0.0297 |
| 9.50 | −0.234 | −0.0302 |
| 9.75 | −0.242 | −0.0308 |
| 10.0 | −0.249 | −0.0314 |

The following numerical results are obtained for the incident geometry from the inequality (4).

TABLE 6

| y(mm) | inequality (4) | y(mm) | inequality (4) |
| --- | --- | --- | --- |
| 1.0 | 0.000 | 6.0 | 0.000 |
| 2.0 | 0.000 | 7.0 | 0.000 |
| 3.0 | 0.000 | 8.0 | — |
| 4.0 | 0.000 | 9.0 | 0.446 |
| 5.0 | 0.000 | 10.0 | 0.508 |

The following numerical results are obtained for the emerging geometry from the inequalities (1) and (2) given above.

TABLE 7

| y(mm) | inequality (1) | inequality (2) |
| --- | --- | --- |
| 8.50 | −0.198 | −0.0279 |
| 8.50 | −0.205 | −0.0283 |
| 8.75 | −0.212 | −0.0287 |
| 9.00 | −0.219 | −0.0292 |
| 9.25 | −0.227 | −0.0297 |
| 9.50 | −0.234 | −0.0302 |
| 9.75 | −0.242 | −0.0308 |
| 10.0 | −0.249 | −0.0314 |

The following numerical results are for the emerging geometry from inequality (4).

TABLE 8

| y(mm) | inequality (4) | y(mm) | inequality (4) |
| --- | --- | --- | --- |
| 1.0 | 0.000 | 6.0 | 0.000 |
| 2.0 | 0.000 | 7.0 | 0.000 |
| 3.0 | 0.000 | 8.0 | — |
| 4.0 | 0.000 | 9.0 | 0.446 |
| 5.0 | 0.000 | 10.0 | 0.508 |

Figure 10A:
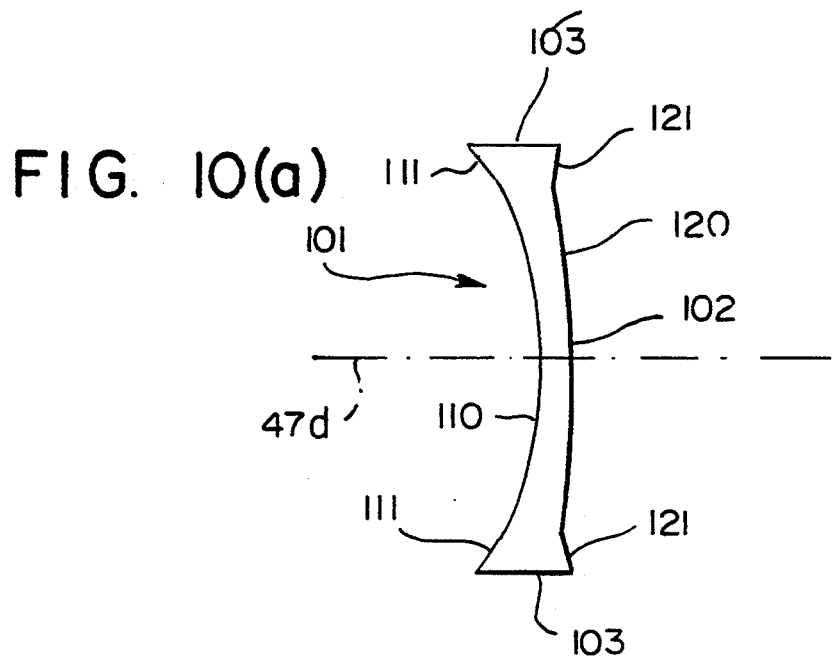
FIG. 10(a) is a perspective view of an optical piece according to a fifth embodiment of the present invention.
Figure 10B:
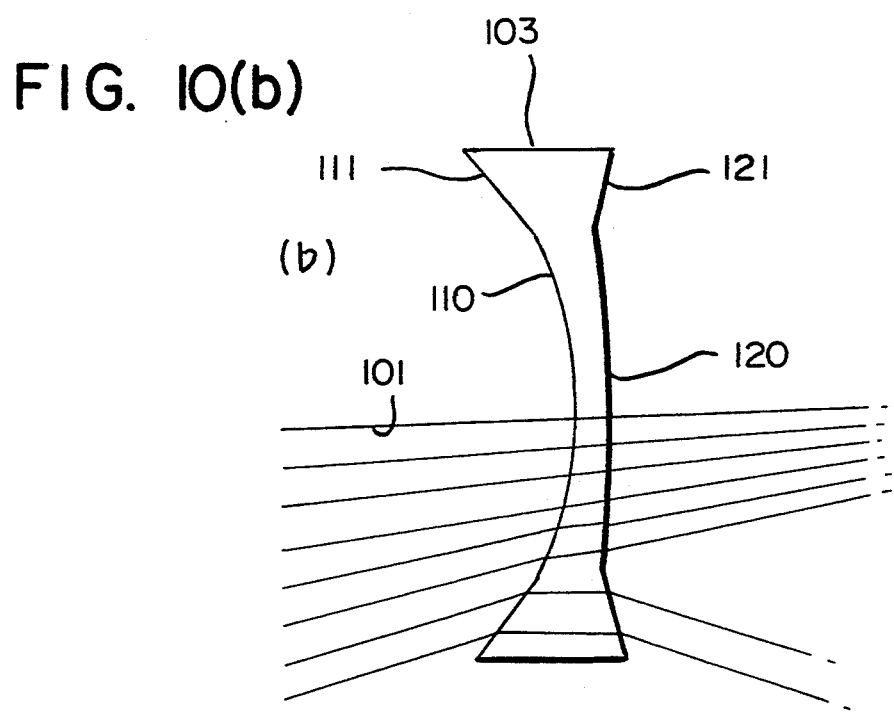
FIG. 10(b) is a perspective and cross-sectional view of an optical piece according to a fifth embodiment of the present invention.
Figure 12:
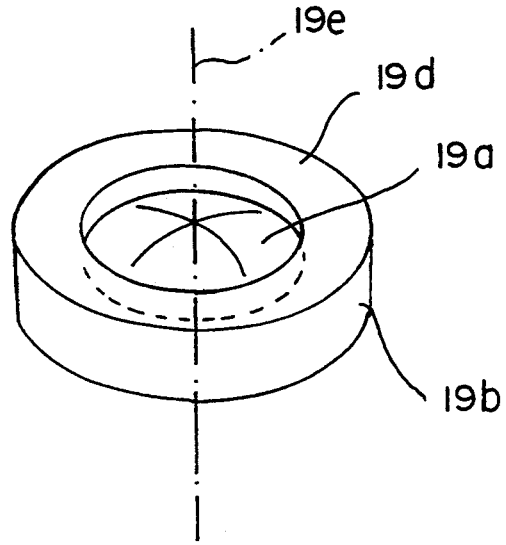
FIG. 12 is a perspective view of the prior art of FIG. 11.
Figure 13:
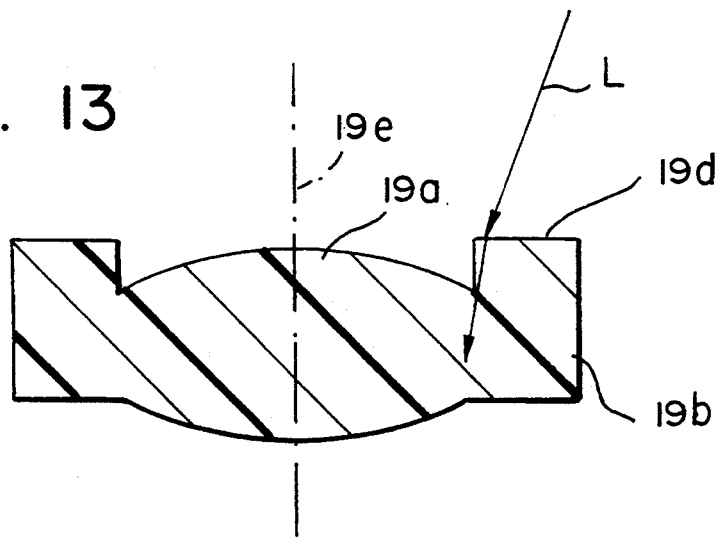
FIG. 13 is a cross sectional view of the prior art of FIG. 12.
Figure 14A:
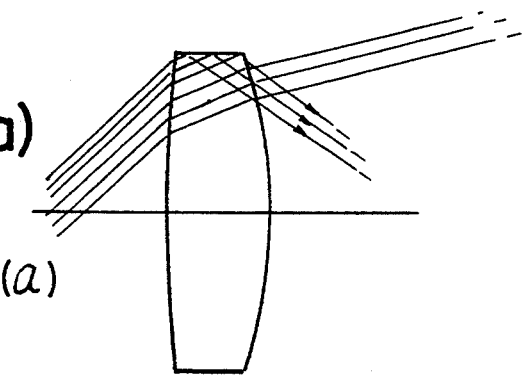
FIGS. 14(a), 14(b) and 14(c) are cross sectional views of different types of prior art.
Figure 14B:
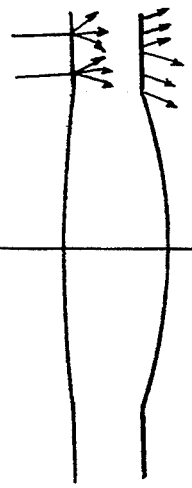
Figure 14C:
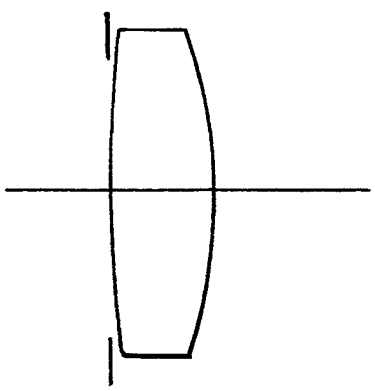

FIGS. 10(a) and 10(b) show a fifth embodiment of the present invention. As shown in FIG. 10(a), the optical piece 47 in this embodiment is a concave-convex lens. Beam incident area 101 includes a beam incident surface 110 having an effective aperture. Beam emerging area 102 includes a beam emerging surface 120 having an effective aperture. Furthermore, peripheral refracting surfaces 111 and 121 are provided around and define the beam incident and emerging surfaces 110 and 120. Finally, optical piece 47 includes side walls 103. Optical axis 47d is shown for explanatory purposes.

The beam incident and emerging surfaces 110 and 120 are lenticular surfaces having certain radii of curvature while the peripheral refracting surfaces 111 and 121 are equivalent to the bilateral plane surfaces of a triangular prism with its apex pointing toward the optical axis 47d.

FIG. 10(b) shows the paths of light rays impinging at an angle with the optical axis 47d. The main beam of the incident light rays falling on the beam incident area 101 impinge on the beam incident surface 110. The remaining part of the beam impinges on the peripheral refracting surface 111 surrounding the beam incident surface 110. The main part of the beam then emerges from the beam emerging surface 120. The remaining part of the incident light rays which impinge on peripheral refracting surface 111 are refracted away from the optical axis 47d thereby. The remaining part of the light rays are further refracted away from the optical axis by the peripheral refracting surface 121. Thus, the paths of the stray light rays and the main beam are in different directions and therefore, flare components are eliminated.

Even if some light rays of light reach the side wall 103, the rays can be diverted from the main beam path by cutting notches in the side wall 103 or by roughening or frosting the side wall 103. Therefore, the main beam is not adversely affected by the stray rays. The peripheral refracting surfaces 111 and 121 are basically optical plane surfaces.

The following are the optical and physical characteristics of the optical piece 47 according to a fifth embodiment of this invention.
Outer diameter: 30 mm
Thickness along optical axis: 3 mm
Wavelength of light: 587.6 nm
Material: Acrylic resin (refractive index=1.49108 for a wavelength 587.6 nm)
Optical characteristics of the incident surface:
Maximum effective diameter: 24 mm
Radius of curvature $r_1$: −30 mm
Sag: Constant k=−5/6, derived by the following formulae;

$$f_1(y)=r_1-(r_1^2-y^2)^{\frac{1}{2}} \ (y<h_{max})$$

$$f_1(y)=r_1-(r_1^2-h_{max}^2)^{\frac{1}{2}}+k(y-h_{max}) \ (y>h_{max})$$

Optical characteristics of the emerging surface:
Maximum effective diameter: 24 mm
Radius of curvature $r_2$: −100 mm
Sag: Constant k=¼, derived by the following formulae;

$$f_2(y) = r_2 - (r_2^2 - y^2)^{\frac{1}{2}} \quad (y < h_{max})$$

$$f_2(y) = r_2 + (r_2^2 - h_{max}^2)^{\frac{1}{2}} + k(y - h_{max}) \quad (y > h_{max})$$

Tables 9 through 12 give numerical data for the fifth embodiment.

The following numerical results are for the incident geometry from inequalities (2) and (3).

TABLE 9

| y(mm) | $\lvert df_k(h_{max})/dy \rvert = 0.436$ | |
|---|---|---|
| | inequality (1) | inequality (2) |
| 12.5 | 0.833 | 0.000 |
| 13.0 | 0.833 | 0.000 |
| 13.5 | 0.833 | 0.000 |
| 14.0 | 0.833 | 0.000 |
| 14.5 | 0.833 | 0.000 |
| 15.0 | 0.833 | 0.000 |

The following numerical results are for the incident geometry from inequality (4).

TABLE 10

| y(mm) | inequality (4) | y(mm) | inequality (4) |
|---|---|---|---|
| 1.0 | 0.033 | 9.0 | 0.314 |
| 2.0 | 0.067 | 10.0 | 0.354 |
| 3.0 | 0.101 | 11.0 | 0.394 |
| 4.0 | 0.135 | 12.0 | — |
| 5.0 | 0.169 | 13.0 | 0.833 |
| 6.0 | 0.204 | 14.0 | 0.833 |
| 7.0 | 0.240 | 15.0 | 0.833 |
| 8.0 | 0.277 | — | — |

The following numerical results are for the emerging surface 320 from the inequalities (1) and (2).

TABLE 11

| y(mm) | inequality (1) | inequality (2) |
|---|---|---|
| 12.5 | −0.246 | 0.000 |
| 13.0 | −0.246 | 0.000 |
| 13.5 | −0.246 | 0.000 |
| 14.0 | −0.246 | 0.000 |
| 14.5 | −0.246 | 0.000 |
| 15.0 | −0.246 | 0.000 |

The following numerical results are for the emerging surface 320 from inequality (4).

TABLE 12

| y(mm) | inequality (4) | y(mm) | inequality (4) |
|---|---|---|---|
| 1.0 | 0.010 | 9.0 | 0.090 |
| 2.0 | 0.020 | 10.0 | 0.101 |
| 3.0 | 0.030 | 11.0 | 0.111 |
| 4.0 | 0.040 | 12.0 | — |
| 5.0 | 0.050 | 13.0 | 0.500 |
| 6.0 | 0.060 | 14.0 | 0.500 |
| 7.0 | 0.070 | 15.0 | 0.500 |
| 8.0 | 0.080 | — | — |

As described above, flare and ghost phenomena attributable to the stray light rays falling on the peripheral portions of the optical piece 47 can be eliminated without using a diaphragm member in front of the optical piece to limit the diameter of the main light beam. In the foregoing description of the embodiments of this invention, both the beam incident and emerging surfaces 110, 120 are integrally bound with the peripheral refracting surfaces 111, 121. It is apparent that only one of the beam incident and emerging surfaces 110, 120 may be provided integrally with a peripheral refracting surface 111, 121. Therefore, an advantage of the data imprinting device 30 according to this invention over the prior art is that stray light can be eliminated without the use of external means.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data imprinting device for use in a camera, comprising:
   at least one light emitting element;
   means for guiding illuminating light emitted from said at least one light emitting element;
   a lens;
   said lens including a central portion and a peripheral refracting surface integrally formed around said central portion; and
   said peripheral refracting surface having a shape effective for refracting said illuminating light cast thereon away from an optical axis passing through said central portion.

2. A data imprinting device for use in a camera as claimed in claim 1, wherein said shape slopes linearly down in a radial direction toward said optical axis.

3. A data imprinting device for use in a camera as recited in claim 1, wherein said shape slopes concavely down in the radial direction toward said optical axis.

4. A data imprinting device for use in a camera as claimed in in claim 1, wherein said at least one light emitting element is a plurality of light emitting elements.

5. An optical piece comprising:
   a beam incident area;
   a beam emerging area;
   at least one of a plane and convex beam passing surface with an effective aperture in said beam incident area and said beam emerging area for passing a main beam of light;
   a peripheral refracting surface around and defining a perimeter of said effective aperture;
   said peripheral refracting surface satisfing the two inequalities:

$$(n' - n) \, df_k(y)/dy < 0, \text{ and}$$

$$(n' - n) \, d^2f_k(y)/dy^2 \leq 0.$$

6. An optical piece as recited in claim 5, wherein the inequality $\lvert df_k(y)/dy \rvert < 1$ holds except at a boundary between said beam passing surface and said peripheral beam refracting surface.

7. An optical piece as recited in claim 6, wherein said optical piece is a double convex lens.

8. An optical piece as recited in claim 6, wherein:
   said optical piece is a triangular prism;
   a beam incident area on said triangular prism
   said beam incident area including a first central portion and a first peripheral portion;
   a reflecting surface in said triangular prism;
   a beam emerging area on said triangular prism;
   said beam emerging area including a second central portion and a second peripheral portion;
   said reflecting surface being angled to reflect substantially all illumination entering said first central portion to said second central portion; and at least one of said first peripheral portion and said second peripheral portion having a shape effective for directing light incident thereon away from said second central portion, whereby flare is reduced.

9. An optical piece comprising:
a beam incident area;
a beam emerging area:
at least one concave beam passing surface with an effective aperture in said beam incident area and beam emerging area for passing a main beam of light;
a peripheral refracting surface around and defining said beam passing surface;
said peripheral refracting surface satisfying the inequalities $$|df_k(y)/dy| > |F_k|, \text{ and}$$

$$(n'-n)d^2f_k(y)/dy^2 \leq 0.$$

10. An optical piece as recited in claim 9, wherein the inequality $|df_k(y)/dy| < 1$ holds except at a boundary between said beam passing surface and said peripheral beam refracting surface.

11. A camera comprising:
a plurality of light emitting elements;
means for guiding illuminating light from said plurality of light emitting elements to a surface;
optical means for focussing said illuminating light on said surface of a photosensitive means for imprinting data; and
said optical means having a lens forming a central portion of said optical means, and a peripheral refracting surface integrally formed around said lens;
said peripheral refracting surface having a surface effective to refract said illuminating light falling thereon away from an optical axis passing through a center of said optical means.

12. A camera as claimed in claim 11, wherein said peripheral shape slopes linearly down in the radial direction toward said optical axis.

13. A camera as claimed in claim 11, wherein said shape is one of two bilateral plane surfaces of a triangular prism with an apex pointing toward said optical axis.

* * * * *